United States Patent
Sharma

(10) Patent No.: US 10,917,544 B2
(45) Date of Patent: Feb. 9, 2021

(54) HEAT TRANSFER BETWEEN INTEGRATED SENSOR-LENS ASSEMBLIES IN AN IMAGE CAPTURE DEVICE

(71) Applicant: GoPro, Inc., San Mateo, CA (US)

(72) Inventor: Monika Sharma, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/398,369

(22) Filed: Apr. 30, 2019

(65) Prior Publication Data

US 2020/0351419 A1    Nov. 5, 2020

(51) Int. Cl.
*H04N 5/225* (2006.01)
*G02B 7/02* (2006.01)

(52) U.S. Cl.
CPC ........... *H04N 5/2252* (2013.01); *G02B 7/021* (2013.01); *H04N 5/2253* (2013.01); *H04N 5/2254* (2013.01)

(58) Field of Classification Search
CPC ........ G03B 37/00; G03B 37/04; G03B 37/06; G03B 19/22; H04N 5/2252; H04N 5/2253; H04N 5/2254; H04N 5/2258; H04N 5/23238; H04N 5/2257; H04N 13/243; H04N 5/2251; G02B 7/021
See application file for complete search history.

(56) References Cited

U.S. PATENT DOCUMENTS

| | | | | |
|---|---|---|---|---|
| 9,591,215 B1 * | 3/2017 | Miller | ................. | H04N 5/23241 |
| 9,742,996 B1 * | 8/2017 | Martin | ................. | H04N 5/23238 |
| 9,838,599 B1 * | 12/2017 | Tam | ................. | H04N 5/23238 |
| 10,054,845 B1 * | 8/2018 | Garcia | ................. | G03B 17/55 |
| 10,108,073 B2 * | 10/2018 | Chiu | ................. | G03B 17/55 |
| 10,291,828 B1 * | 5/2019 | Hsu | ................. | H04N 5/23238 |
| 10,397,453 B2 * | 8/2019 | Choi | ................. | H04N 5/2258 |
| 2006/0049350 A1 * | 3/2006 | Teich | ................. | G08B 13/19641 250/330 |
| 2008/0191124 A1 * | 8/2008 | Irikiin | ................. | H04N 5/2253 250/208.1 |
| 2008/0198556 A1 * | 8/2008 | Iwata | ................. | H01L 27/14618 361/717 |
| 2011/0051374 A1 * | 3/2011 | Chen | ................. | H04N 5/2252 361/709 |
| 2014/0240454 A1 * | 8/2014 | Hirata | ................. | H04N 5/23232 348/38 |

(Continued)

*Primary Examiner* — Chiawei Chen
(74) *Attorney, Agent, or Firm* — Young Basile Hanlon & MacFarlane, P.C.

(57) ABSTRACT

An image capture device is disclosed that includes: a body; first and second image capture devices supported within the body so as to define respective, overlapping first and second fields-of-view; and a thermal spreader. The first image capture device includes a first integrated sensor-lens assembly (ISLA) with a first image sensor and a first lens, and the second image capture device includes a second ISLA with a second image sensor and a second lens. The first lens faces in a first direction, and is positioned to receive and direct light onto the first image sensor, and the second lens faces in a second direction, and is positioned to receive and direct light onto the second image sensor, wherein the second direction is generally opposite to the first direction. The thermal spreader extends between, and is connected to, the first and second ISLAs, and is configured to transfer heat therebetween.

20 Claims, 11 Drawing Sheets

(56) References Cited

U.S. PATENT DOCUMENTS

| | | | |
|---|---|---|---|
| 2015/0348580 A1* | 12/2015 | van Hoff | G11B 19/20 |
| | | | 348/38 |
| 2016/0349600 A1* | 12/2016 | Macmillan | G03B 17/561 |
| 2017/0195533 A1* | 7/2017 | Seo | H04N 5/23238 |
| 2018/0317339 A1* | 11/2018 | Evans, V | H05K 7/20127 |
| 2019/0052785 A1* | 2/2019 | Ai | G03B 37/04 |
| 2019/0137724 A1* | 5/2019 | Kim | G02B 9/60 |
| 2019/0146313 A1* | 5/2019 | De La Cruz | G03B 21/147 |

\* cited by examiner

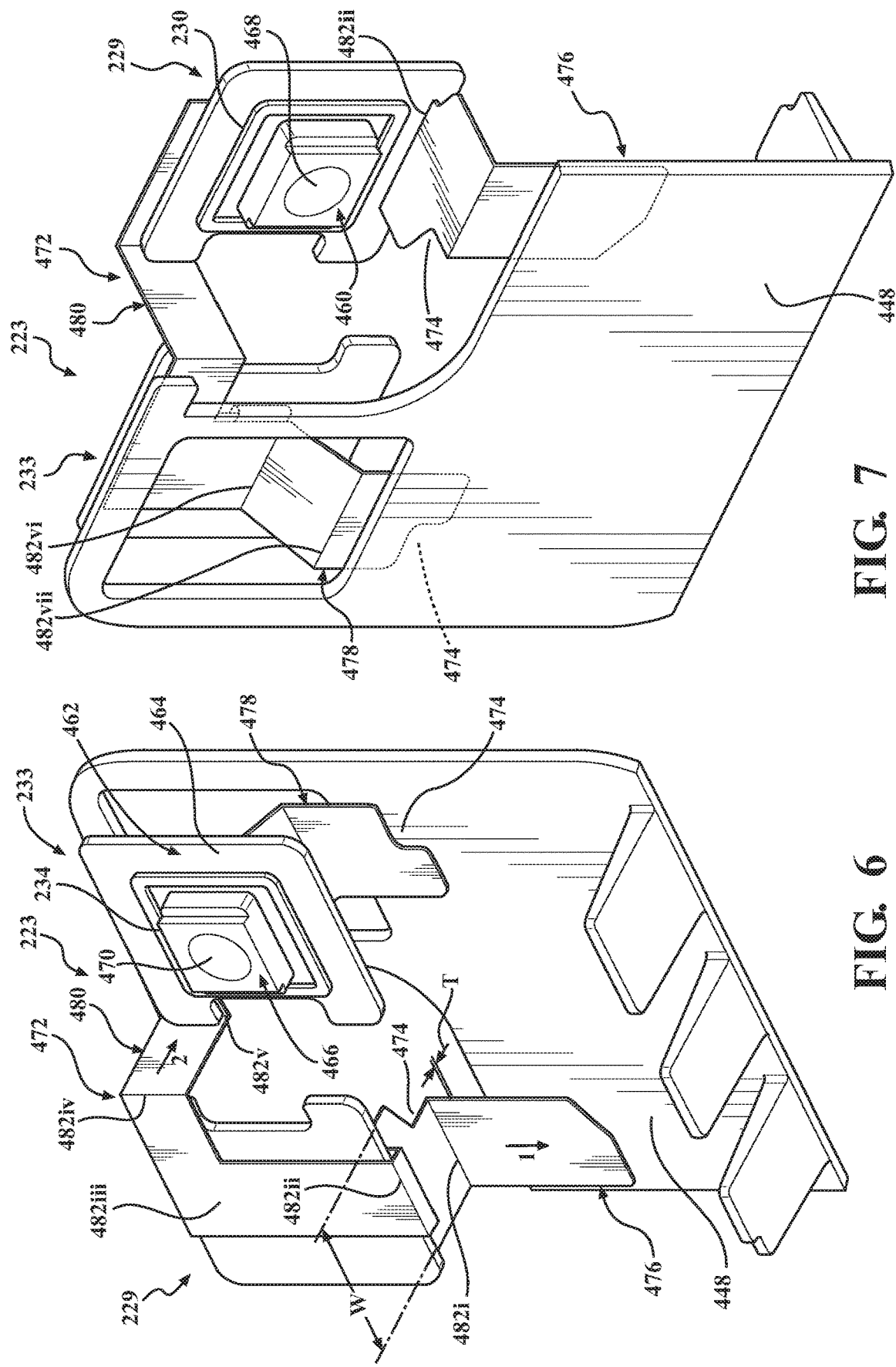

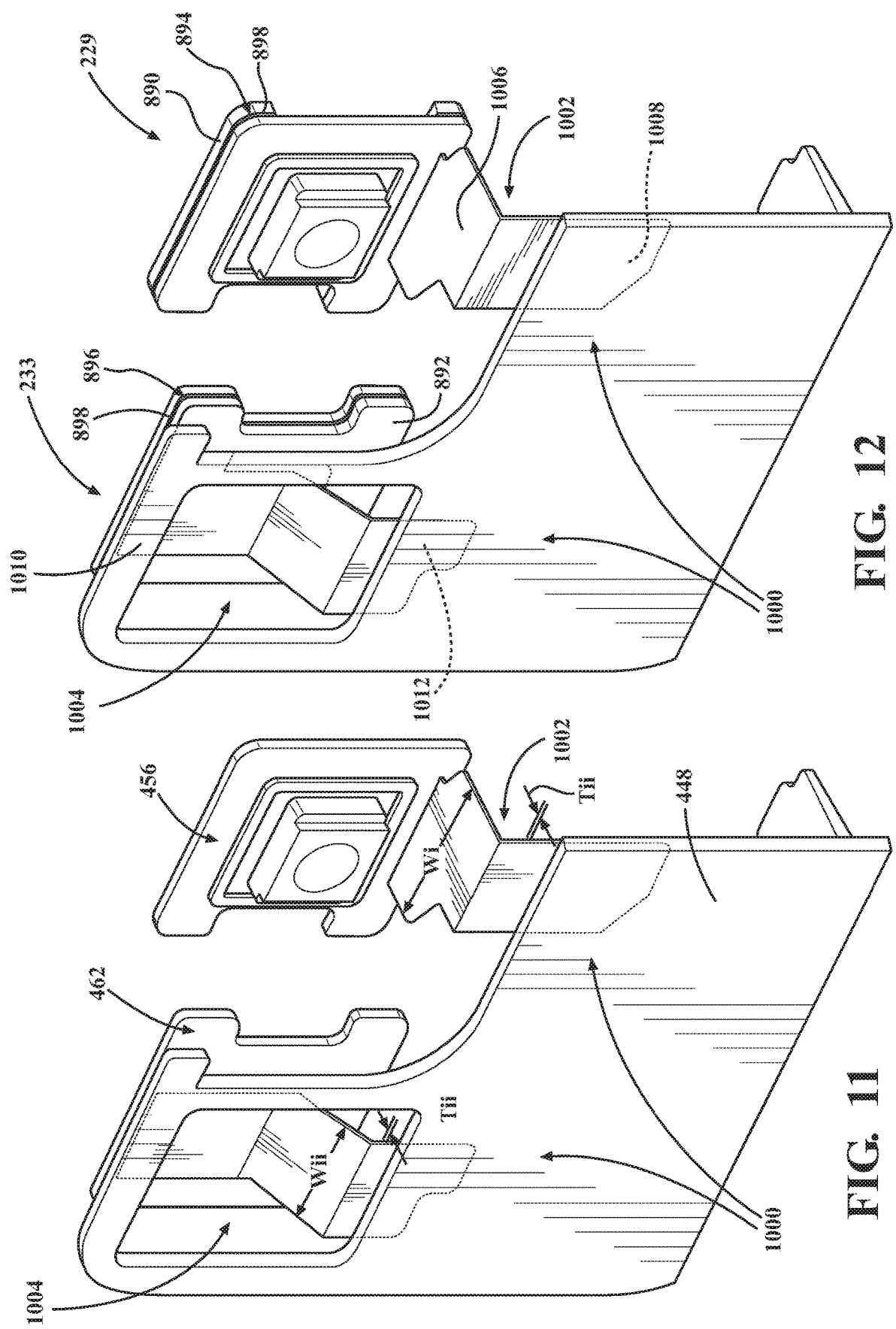

HEAT TRANSFER BETWEEN INTEGRATED SENSOR-LENS ASSEMBLIES IN AN IMAGE CAPTURE DEVICE

CROSS-REFERENCE TO RELATED APPLICATION(S)

None.

TECHNICAL FIELD

The present disclosure relates generally to image capture devices, and, more specifically, to transferring heat between integrated sensor-lens assemblies (ISLAs) in an image capture device.

BACKGROUND

Image capture devices take a variety of forms and find wide applicability in handheld cameras and video recorders, cell phones, drones, and vehicles. These devices capture, focus, and convert light into an electronic image signal using an optical module that typically includes one or more integrated sensor-lens assemblies (ISLAs). During operation, however, the ISLAs generate heat that must be efficiently managed, which is conventionally done by transferring heat directly from the ISLAs to one or more heat sinks.

The present disclosure discusses various advancements in the management of heat generated during the operation of image capture devices. In particular, the present disclosure describes the transfer of heat between ISLAs such that the ISLAs can themselves serve as additional heat sinks when inactive.

SUMMARY

In one aspect of the present disclosure, a device is disclosed that includes: a body; a first image capture device supported within the body and defining a first field-of-view; a second image capture device supported within the body and defining a second field-of-view that overlaps the first field-of-view; and a thermal spreader. The first image capture device includes a first integrated sensor-lens assembly (ISLA) with a first image sensor and a first lens, and the second image capture device includes a second ISLA with a second image sensor and a second lens. The first lens faces in a first direction, and is positioned to receive and direct light onto the first image sensor, and the second lens faces in a second direction, and is positioned to receive and direct light onto the second image sensor, wherein the second direction is generally opposite to the first direction. The thermal spreader is connected to, and extends between, the first and second ISLAs, and is configured to transfer heat therebetween.

In certain embodiments, the image capture device may be configured for operation in a first mode, during which, the first and second image sensors are each active such that images are capturable by each of the first and second image capture devices, and a second mode, during which, only one of the first and second image sensors is active such that images are capturable by only one of the first and second image capture devices.

In certain embodiments, the first ISLA may further include a first printed circuit board supporting the first image sensor and including a first conductive overlay, and the second ISLA may further include a second printed circuit board supporting the second image sensor and including a second conductive overlay. In such embodiments, the thermal spreader may be connected to the first and second conductive overlays (rather than to the first and second image sensors themselves).

In certain embodiments, the thermal spreader may be unitary in construction.

In certain embodiments, the thermal spreader may include (e.g., may be formed partially or entirely from) graphite.

In certain embodiments, the thermal spreader may define a maximum width that lies substantially within the range of approximately 15 mm to approximately 25 mm.

In certain embodiments, the thermal spreader may define a maximum thickness that lies substantially within the range of approximately 0.05 mm to approximately 0.1 mm.

In certain embodiments, the image capture device may further include a heat sink. In such embodiments, the thermal spreader may include opposing first and second end portions that are connected to the heat sink.

In certain embodiments, the thermal spreader may include an intermediate portion that extends between the first and second end portions, wherein the intermediate portion is connected to the first and second image sensors.

In certain embodiments, the thermal spreader may be non-linear in configuration. For example, the thermal spreader may define a first elbow that is positioned adjacent to the first image sensor, a second elbow that is positioned between the first image sensor and the second image sensor, and a third elbow that is positioned adjacent to the second image sensor.

In another aspect of the present disclosure, an optical module for an image capture device is disclosed. The optical module includes: a first integrated sensor-lens assembly (ISLA) with a first image sensor and a first lens; a second integrated sensor-lens assembly (ISLA) with a second image sensor and a second lens; and a bridge that is connected to the first ISLA and to the second ISLA. The bridge includes a thermally conductive material to facilitate heat transfer between the first ISLA and the second ISLA.

In certain embodiments, the first ISLA may define a first field-of-view, and the second ISLA may define a second field-of-view that overlaps the first field-of-view.

In certain embodiments, the bridge may be unitary in construction.

In certain embodiments, the bridge may include (e.g., may be formed partially or entirely from) graphite.

In certain embodiments, the bridge may define a maximum width that lies substantially within the range of approximately 15 mm to approximately 25 mm, and a maximum thickness that lies substantially within the range of approximately 0.05 mm to approximately 0.1 mm.

In certain embodiments, the bridge may include a tortuous configuration. For example, the bridge may define a first elbow that is positioned adjacent to the first ISLA, a second elbow that is positioned between the first ISLA and the second ISLA, and a third elbow that is positioned adjacent to the second ISLA.

In another aspect of the present disclosure, a method of assembling an optical module for an image capture device is disclosed. The method includes: connecting opposite first and second end portions of a thermal bridge to a heat sink; and connecting an intermediate portion of the thermal bridge (i.e., a portion of the thermal bridge that extends between the first and second end portions) to a first integrated sensor-lens assembly (ISLA) and to a second ISLA such that the thermal bridge extends between the first and second ISLAs to thermally connect the first and second ISLAs and facilitate heat transfer therebetween.

In certain embodiments, the method may further include orienting the first ISLA such that a lens of the first ISLA faces in a first direction, and orienting the second ISLA such that a lens of the second ISLA faces in a second direction generally opposite to the first direction, whereby a first field-of-view defined by the first ISLA overlaps a second field-of-view defined by the second ISLA.

In certain embodiments, connecting the intermediate portion of the thermal bridge to the first ISLA and to the second ISLA may include positioning the thermal bridge such that the intermediate portion extends, at least partially, in transverse relation to image sensors of the first and second ISLAs.

In certain embodiments, the thermal bridge may be unitary in construction.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 6 is a partial, front, perspective view of the optical module seen in FIG. 4 illustrating connection of the first and second ISLAs to a heat sink via a thermal spreader.

FIG. 7 is a partial, rear, perspective view of the optical module seen in FIG. 6.

FIG. 11 is a partial, rear, perspective view of an alternate embodiment of the optical module in which the thermal spreader includes individual thermal bridges.

FIG. 12 is a partial, rear, perspective view of an alternate embodiment of the optical module seen in FIG. 11 in which the first and second ISLAs each include a conductive overlay.

DETAILED DESCRIPTION

Figure 1A:
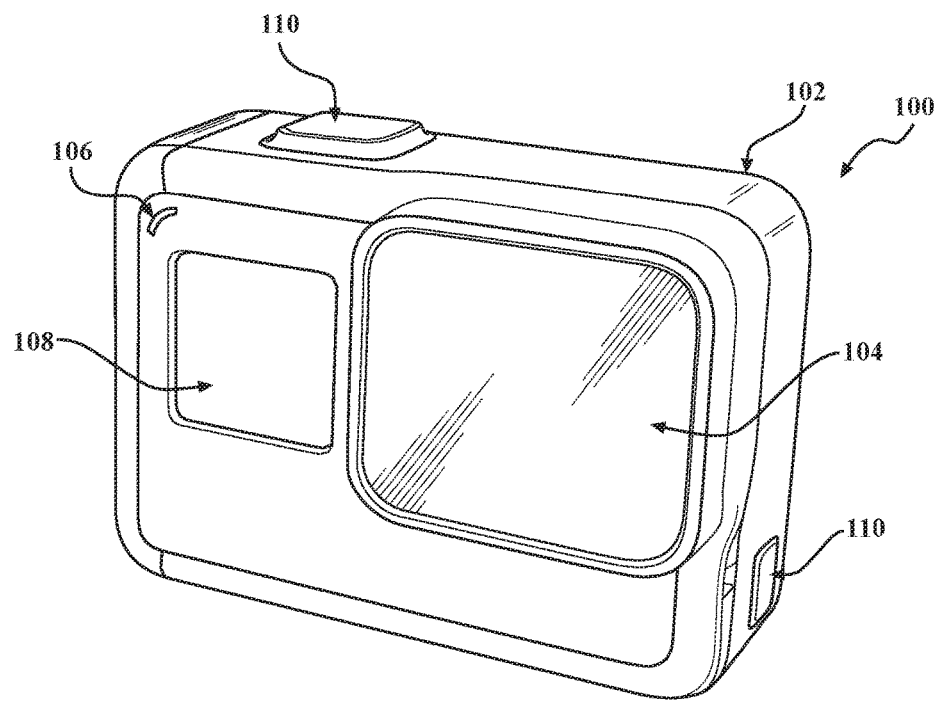
FIGS. 1A-D are isometric views of an example of an image capture device.

The present disclosure describes image capture devices that include an optical module with dual (first and second) ISLAs. The ISLAs are oriented in generally opposite directions (i.e., such that the ISLAs are rotated approximately 180° from each other), and include overlapping fields-of-view so as to support the capture and creation of not only individual images, but spherical images as well.

In certain image capture devices, heat is transferred away from the ISLAs by connecting the ISLAs to a heat sink via individual thermal bridges (or other such heat transfer members). The present disclosure improves upon heat transfer in image capture devices by including a single heat transfer member (e.g., a graphite thermal spreader or bridge) that is unitary in construction. The thermal spreader is connected to, and extends between, the ISLAs, and includes opposing end portions that are connected to the heat sink in the image capture device. By connecting the ISLAs via the thermal spreader, both physically and thermally, heat generated by one of the ISLAs is transferrable to the other. For example, when the image capture device is being used to capture single (e.g., non-spherical) images and/or video, only a single ISLA is operating at any given time. During such use, heat can be transferred away from the operational ISLA to the non-operational ISLA using the thermal spreader to increase run time of the image capture device, which is particularly advantageous during the capture of higher-resolution (e.g., 4$k$) image(s) and/or video.

FIGS. 1A-D are isometric views of an example of an image capture device 100. The image capture device 100 may include a body 102 having a lens 104 structured on a front surface of the body 102, various indicators on the front surface of the body 102 (such as LEDs, displays, and the like), various input mechanisms (such as buttons, switches, and touchscreen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and an LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
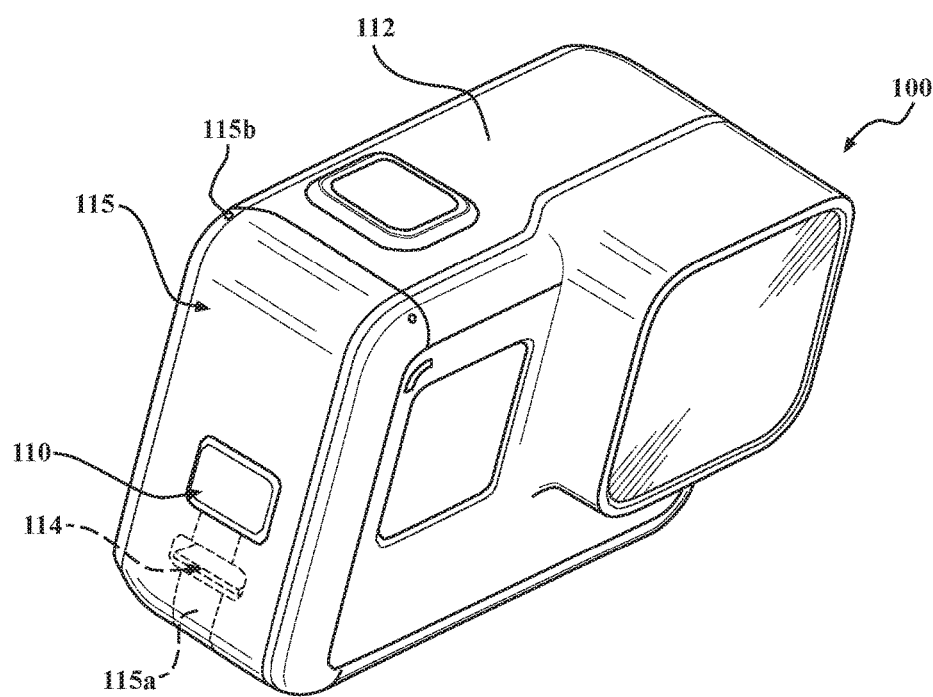
Figure 1C:
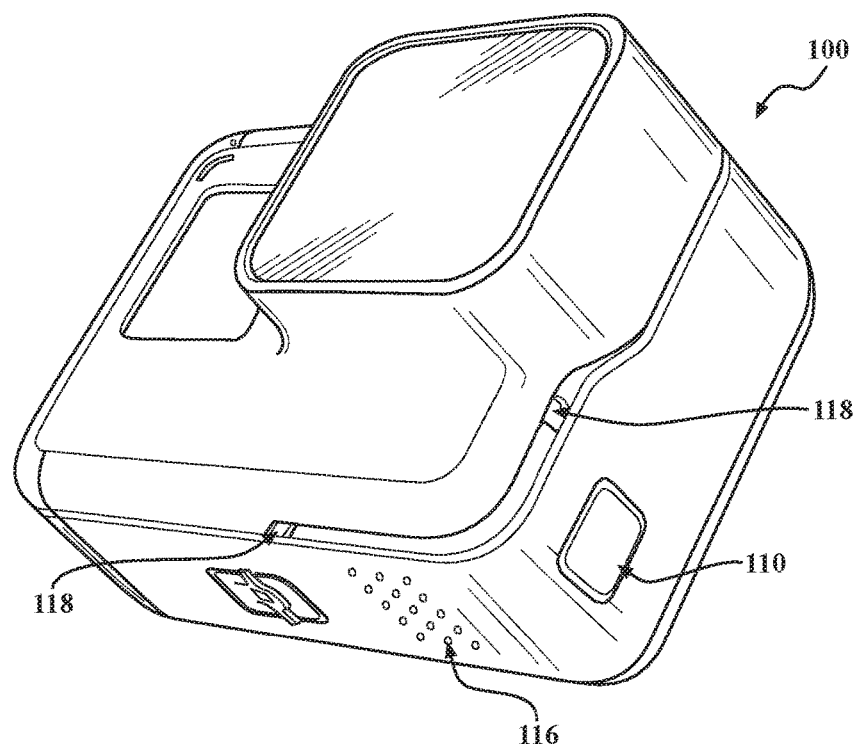
Figure 1D:
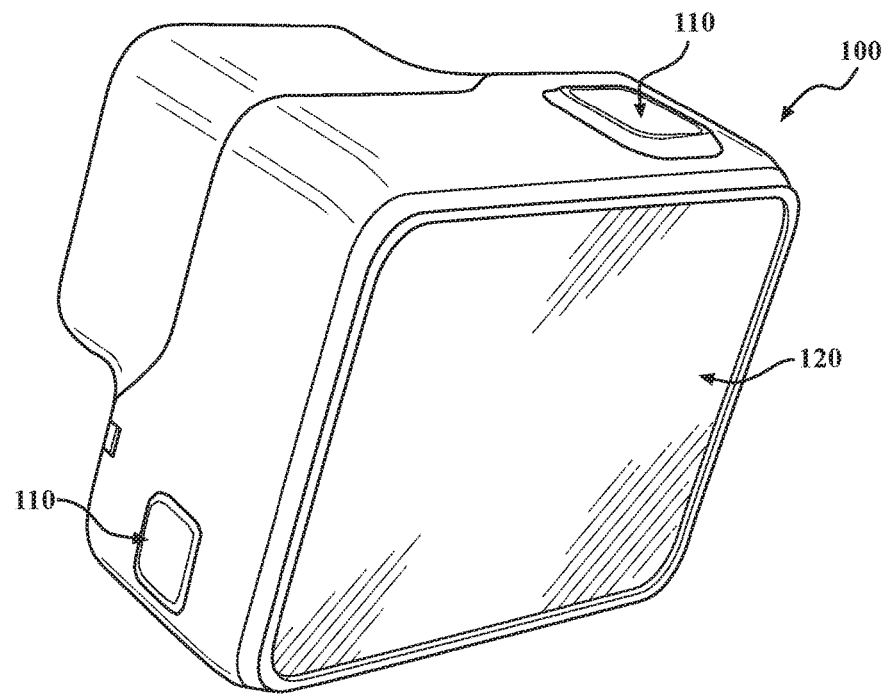

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115$a$ (e.g., hidden as indicated using dotted lines) that is opened by engaging the associated button 110 as shown.

The removable door 115 can also be secured to the image capture device 100 using a hinge mechanism 115$b$, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115$a$ and the hinge mechanism 115$b$ allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described herein. For example, the image capture device 100 may include additional buttons or different interface features, such as interchangeable lenses, cold shoes and hot shoes that can add functional features to the image capture device 100, etc.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the Internet, may be used.

In some implementations, the computing communication link may be a Wi-Fi link, an infrared link, a Bluetooth (BT) link, a cellular link, a ZigBee link, a near-field communications (NFC) link (such as an ISO/IEC 20643 protocol link), an Advanced Network Technology interoperability (ANT+) link, and/or any other wireless communications link or combination of links.

In some implementations, the computing communication link may be an HDMI link, a USB link, a digital video interface link, a display port interface link (such as a Video Electronics Standards Association (VESA) digital display interface link), an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
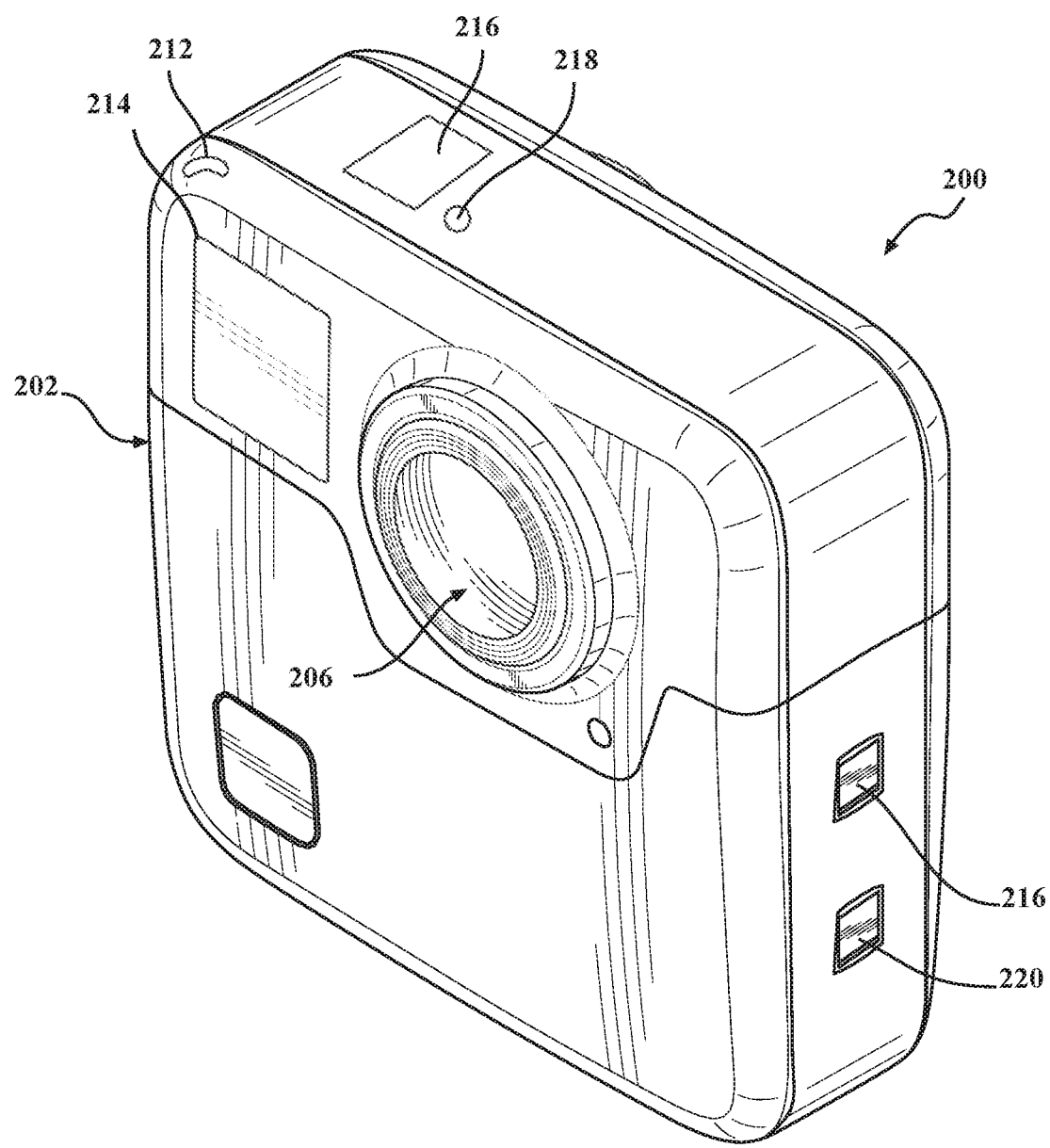
FIGS. 2A-B are isometric views of another example of an image capture device.
Figure 2B:
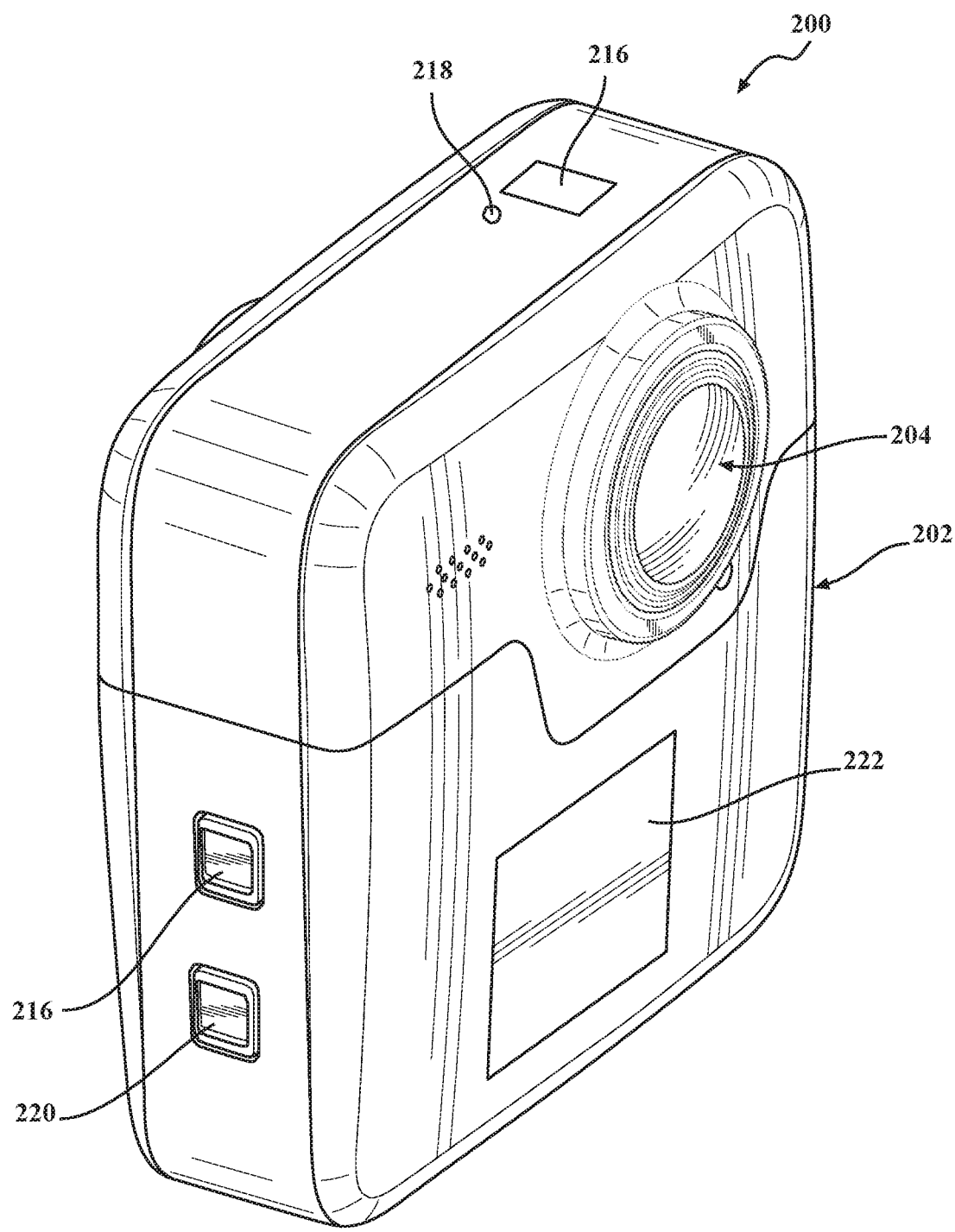

FIGS. 2A-B illustrate another example of an image capture device 200. The image capture device 200 includes a body 202 and two camera lenses 204, 206 disposed on opposing surfaces of the body 202, for example, in a back-to-back or Janus configuration. Although generally depicted as a camera, it should be appreciated that the particular configuration of the image capture device 200 may be varied in alternate embodiments of the disclosure. For example, it is envisioned that the image capture device 200 may instead take the form of a cell phone.

The image capture device may include electronics (e.g., imaging electronics, power electronics, etc.) internal to the body 202 for capturing images via the lenses 204, 206 and/or performing other functions. The image capture device may include various indicators, such as an LED light 212 and an LCD display 214.

The image capture device 200 may include various input mechanisms, such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
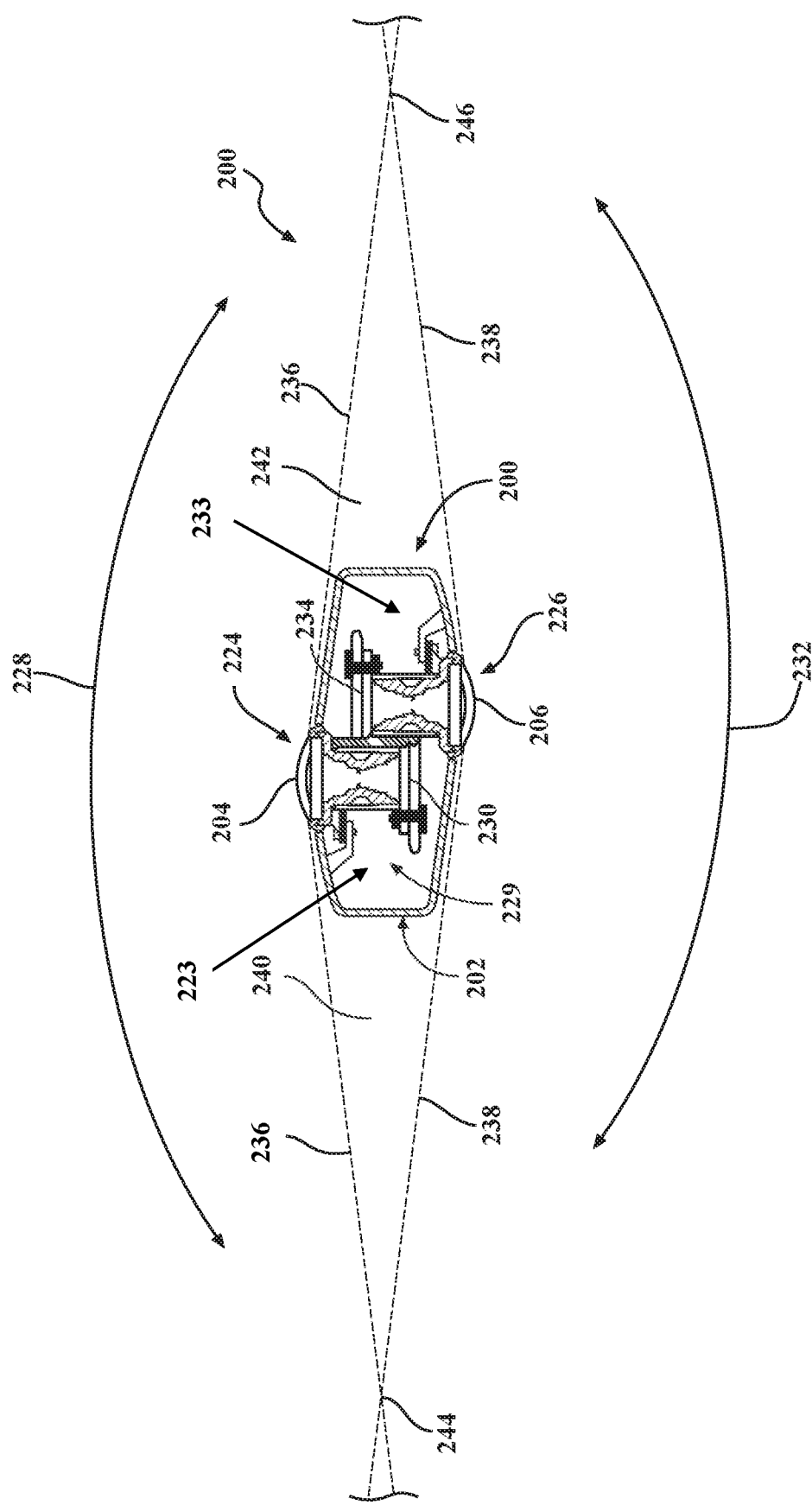
FIG. 2C is a cross-sectional view of the image capture device of FIGS. 2A-B.

FIG. 2C is a cross-sectional view of an optical module 223 of the image capture device 200 of FIGS. 2A-B. The optical module 223 facilitates the capture of spherical images, and, accordingly, includes a first image capture device 224 and a second image capture device 226. The first image capture device 224 defines a first field-of-view 228, as shown in FIG. 2C, and includes a first integrated sensor-lens assembly (ISLA) 229 that receives and directs light onto a first image sensor 230 via the lens 204. Similarly, the second image capture device 226 defines a second field-of-view 232, as shown in FIG. 2C, and includes a second ISLA 233 that receives and directs light onto a second image sensor 234 via the lens 206. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242, may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, the stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
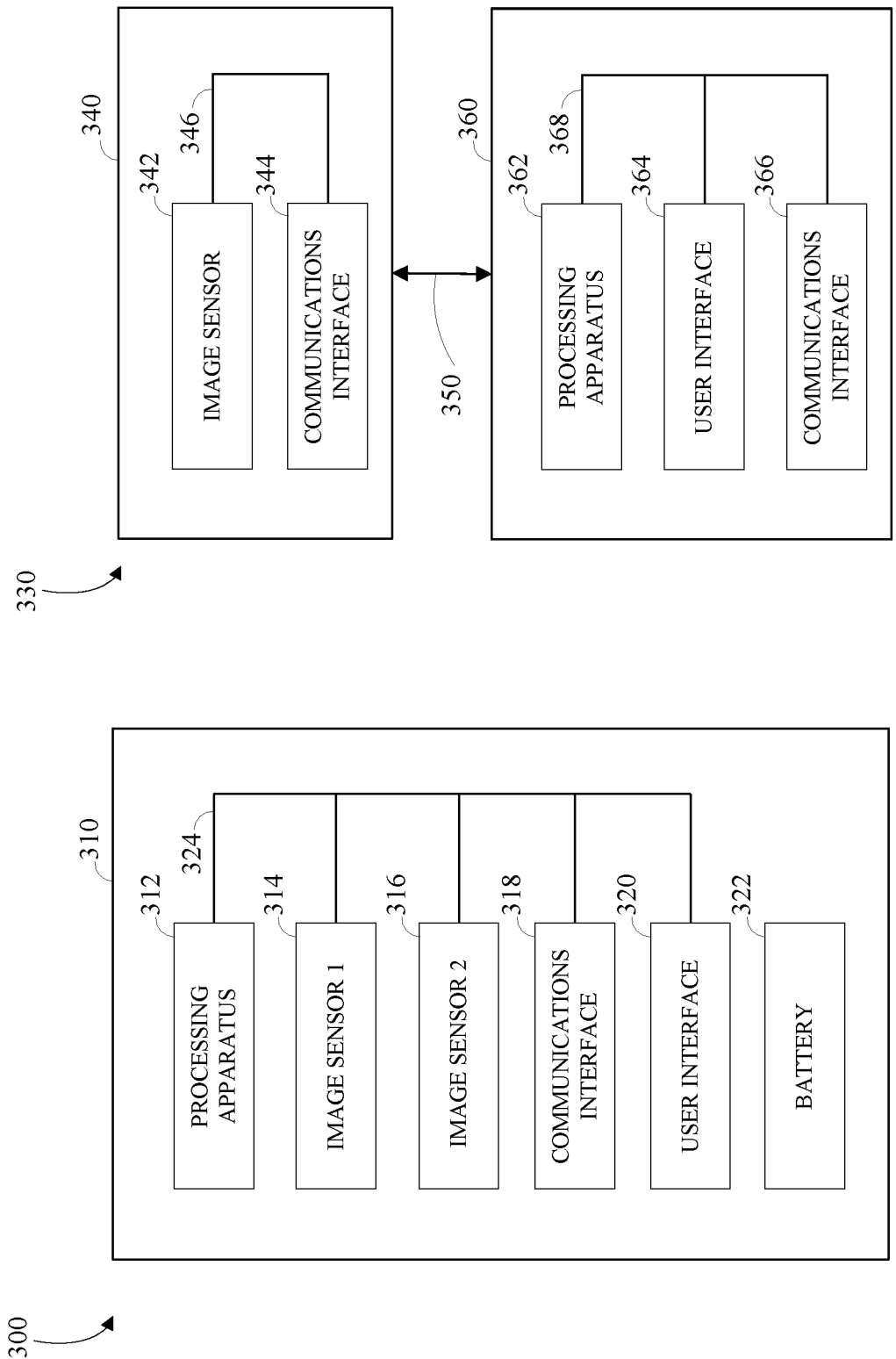
FIGS. 3A-B are block diagrams of examples of image capture systems.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory (RAM) device, flash memory, or another suitable type of storage device, such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields-of-view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be used to implement some or all of the techniques described in this disclosure.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device, such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure.

Figure 5:
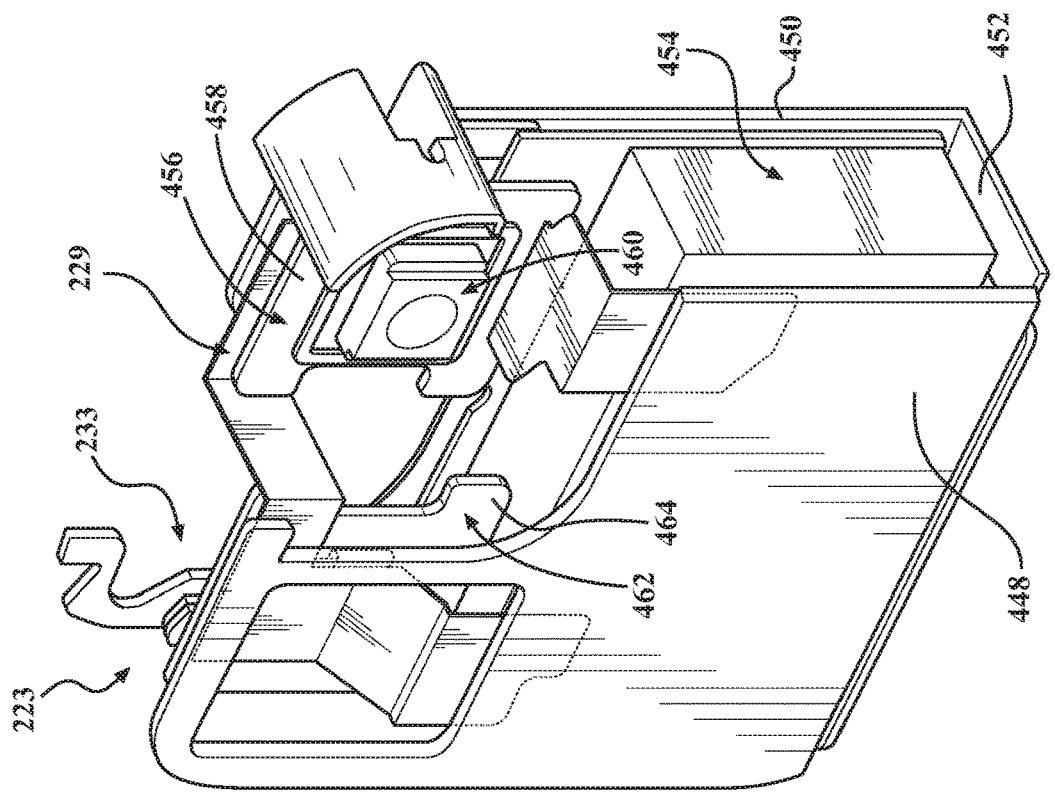
FIG. 5 is a partial, rear, perspective view of the optical module seen in FIG. 4.
Figure 4:
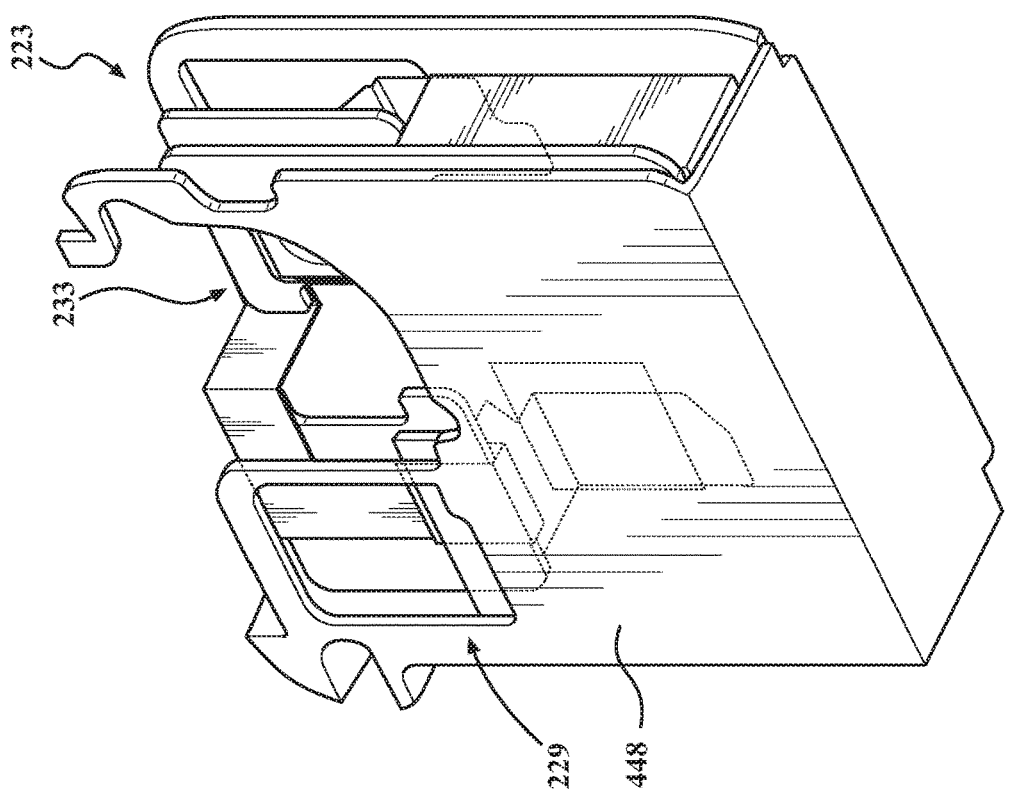
FIG. 4 is a partial, front, perspective view of an optical module of the image capture device seen in FIGS. 2A-B, which includes first and second integrated sensor-lens assemblies (ISLAs) that are connected by a thermal spreader.

With reference now to FIGS. 4-7, the aforementioned optical module 223 and ISLAs 229, 233 (seen in FIG. 2) will be discussed in additional detail. The optical module 223 includes (first and second) heat sinks 448, 450 that are connected, either directly or indirectly, to various components of the image capture device 200. FIGS. 4 and 5 are respective front and rear perspective views of the optical module 223, and FIGS. 6 and 7 are respective front and rear perspective views of the optical module 223 with the heat sink 450 removed. In the illustrated embodiment, for example, the heat sink 448 is connected to the ISLAs 229, 233, and the heat sink 450 is connected to other supportive components of the image capture device 200 (e.g., the aforementioned processing apparatus 312 (FIG. 3A). The heat sinks 448, 450 may include (e.g., may be formed partially or entirely from) any material or combination of materials that is suitable for the intended purpose of dissipating heat, such as, for example, aluminum. In the embodiment of the disclosure seen in FIGS. 4-7, the heat sinks 448, 450 are positioned so as to define a cavity 452 (FIG. 5) therebetween that is configured to receive a power source 454 for the image capture device 200 (e.g., the aforementioned battery 322 (FIG. 3A)). It should be appreciated, however, that the particular configuration and/or orientation of the heat sinks 448, 450 may be varied in alternate embodiments of the disclosure.

The first ISLA 229 includes a substrate 456 (FIG. 5) (e.g., a printed circuit board (PCB) 458) that supports an electrical assembly 460, and the second ISLA 233 includes a substrate 462 (FIG. 4) (e.g., a PCB 464) that supports an electrical assembly 466 (FIG. 6). The electrical assemblies 460, 466 include the image sensors 230, 234 (FIGS. 6, 7), respectively, and may also include one or more additional electrical components. For example, the electrical assemblies 460, 466 may include processors 468, 470 (FIGS. 5-7), which may be supported by (or adjacent to) the image sensors 230, 234, respectively, as well as wiring, flexible printed circuits, etc. Although generally contemplated as including a layered construction, it should be appreciated that the particular configuration of the PCBs 458, 464 may be varied in alternate embodiments of the present disclosure.

The optical module 223 also includes a thermal spreader 472 that extends between the ISLAs 229, 233 (e.g., between the respective image sensors 230, 234). The thermal spreader 472 is configured to transfer heat between the ISLAs 229, 233 (from one of the ISLAs 229, 233 to the other), and, thus, physically and thermally connects the ISLAs 229, 233. As such, the thermal spreader 472 may also be referred to herein as a bridge (and/or a thermal bridge).

The thermal spreader 472 may include (e.g., may be formed partially or entirely from) any material or combination of materials that is suitable for the intended purpose of transferring heat between the ISLAs 229, 233. For example, in one particular embodiment, it is envisioned that the thermal spreader 472 may include (e.g., may be formed partially or entirely from) graphite. It should be appreciated, however, that the use of other materials would not be beyond the scope of the present disclosure. Additionally, although shown as being unitary in construction (i.e., as being formed from a single piece of material) throughout the figures, in alternate embodiments of the disclosure, it is envisioned that the thermal spreader 472 may include a series of individual segments that are connected to each other during manufacture or assembly of the optical module 223.

The thermal spreader 472 defines a maximum width W (FIG. 6) and a maximum thickness T. While it is generally envisioned that the width W may lie substantially within the range of approximately 15 mm to approximately 25 mm (e.g., 19.6 mm), and that the thickness T may lie substantially within the range of approximately 0.05 mm to 0.1 mm (e.g., 0.064 mm), it should be appreciated that widths W and/or thicknesses T outside of these ranges would not be beyond the scope of the present disclosure. In certain embodiments, it is envisioned that the thickness T of the thermal spreader 472 may be varied and/or customized by stacking multiple layers of material (e.g., via the use of a thermal adhesive, or any other suitable connector) such that the thermal spreader 472 includes a laminated construction.

It is envisioned that the width W of the thermal spreader 472 may be non-uniform. For example, the thermal spreader 472 may include one or more areas of reduced width, and/or one or more notches (cutouts) 474 (FIGS. 6, 7) (e.g., to accommodate other components of the optical module 223 or the image capture device 200, such as wiring, connectors, fasteners, flexible printed circuits, etc.). In alternate embodiments of the disclosure, however, it is envisioned that the width W of the thermal spreader 472 may be generally uniform.

The thermal spreader 472 includes opposite (first and second) end portions 476, 478 (FIGS. 6, 7), and an intermediate portion 480 that extends between the end portions 476, 478. As seen in FIGS. 6 and 7, the end portions 476, 478 are connected to the heat sink 448, and the intermediate portion 480 is connected to the ISLAs 229, 233 (e.g., to the respective substrates 456, 462). It is envisioned that the thermal spreader 472 may be connected to the heat sink 448 and to the ISLAs 229, 233 in any suitable manner, such as, for example, through the use of a thermal adhesive.

The thermal spreader 472 includes a non-linear, tortuous configuration that allows the thermal spreader 472 to extend between, and connect, the ISLAs 229, 233 and the heat sink 448. More specifically, in the illustrated embodiment, the thermal spreader 472 includes a series of elbows (bends) 482 that facilitate changes in direction and orientation to allow for connection of the ISLAs 229, 233 and the heat sink 448 in the manner described herein. For example, in the illustrated embodiment, the thermal spreader 472 includes (first to seventh) elbows 482i-482vii, wherein the elbows 482ii, 482iii are positioned adjacent to the ISLA 229, the elbows 482iv, 482v are positioned between the ISLAs 229, 233, whereby the intermediate portion 480 of the thermal spreader 472 extends (at least partially) in transverse relation to the ISLAs 229, 233 (e.g., to the image sensors 230, 234), and the elbows 482vi, 482vii are positioned adjacent to the ISLA 233. It should be appreciated, however, that the particular configuration and/or orientation of the thermal spreader 472 may be varied in alternate embodiments of the disclosure (e.g., dependent upon spatial requirements, the configuration of the ISLAs 229, 233, etc.). Accordingly, embodiments including greater and fewer numbers of elbows 482 would not be beyond the scope of the present disclosure.

As mentioned above, the thermal spreader 472 allows for improved management of the heat generated (e.g., by the ISLAs 229, 233) during use of the image capture device 200. For example, in certain embodiments, it is envisioned that the image capture device 200 may be operable in a first (spherical) mode, in which both of the ISLAs 229, 233 are active, or a second (standard) mode, in which only one of the ISLAs 229, 233 is active (e.g., the ISLA 229), the election of which may be made via the LCD display 214, the buttons 216, the interactive display 222, or via input in any other suitable manner. During operation in the second mode, the inactive ISLA (e.g., the ISLA 233 in the present example) may be used as a supplemental heat sink such that heat is transferrable away from the active ISLA 229 in a first direction (identified by the arrow 1 in FIG. 6) to the heat sink 448, and in a second direction (identified by the arrow 2) to the inactive ISLA 233, and, ultimately, to the heat sink 448. Utilizing the inactive ISLA 233 as an additional heat sink allows for greater heat dissipation, and, thus, slows the rate at which the temperature of the ISLA 229 rises, which may be particularly advantageous during the capture of higher (e.g., 4k) resolution images and/or video, the resolution of which may again be elected using the LCD display 214, the buttons 216, the interactive display 222, or via input in any other suitable manner. Slowing the rate at which the active ISLA 229 is heated may not only allow for increased run time of the image capture device 200, but may also increase the usable life of the various components of the optical module 223 and the image capture device 200.

Figure 9:
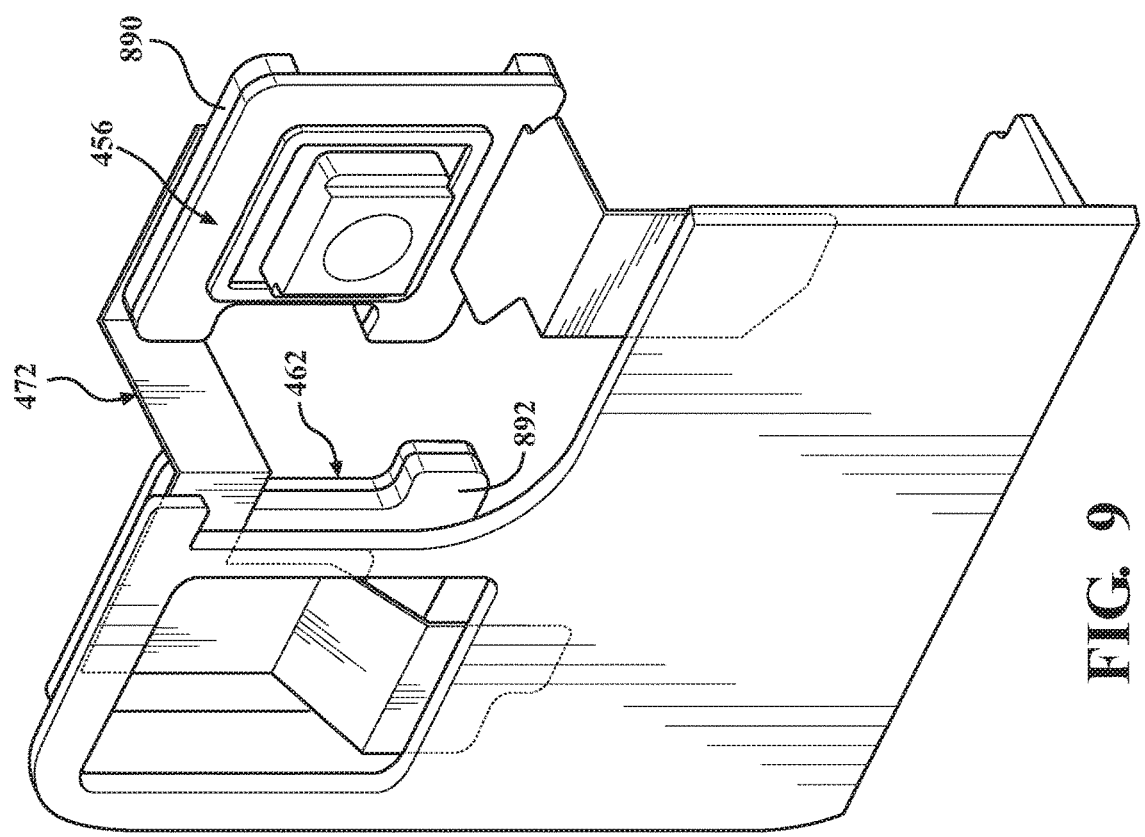
FIG. 9 is a partial, rear, perspective view of the optical module seen in FIG. 8.
Figure 8:
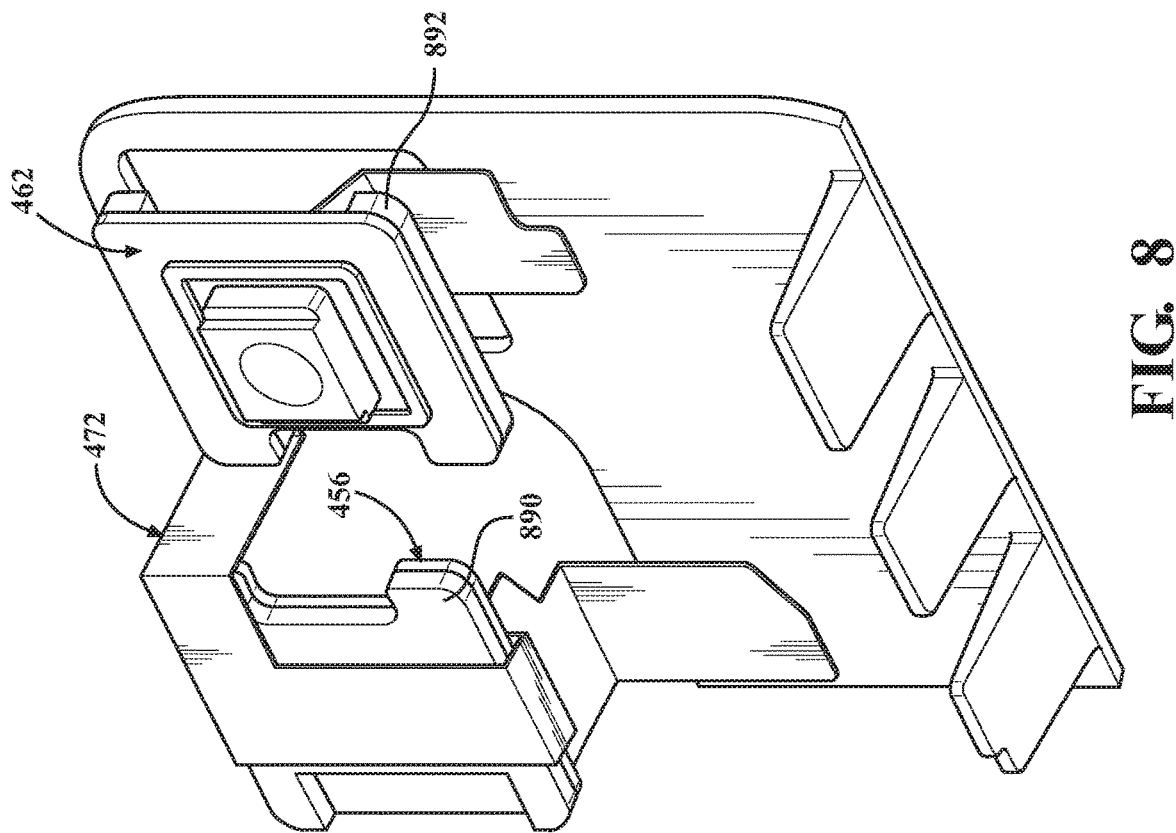
FIG. 8 is a partial, front, perspective view of an alternate embodiment of the optical module in which the first and second ISLAs each include a conductive overlay.

FIGS. 8 and 9 illustrate front and rear perspective views of an alternate embodiment of the disclosure in which the ISLAs 229, 233 include conductive overlays 890, 892, respectively, to increase thermal conductivity of the ISLAs 229, 233. It is envisioned that the conductive overlays 890, 892 may include (e.g., may be formed from) any material or combination of materials that is suitable for the intended purpose of transferring heat away from the ISLAs 229, 233 (e.g., away from the respective image sensors 230, 234). For example, in one particular embodiment, it is envisioned that the conductive overlays 890, 892 may include (e.g., may be formed partially or entirely from) copper. While the ISLAs 229, 233 are each illustrated as including respective overlays 890, 892, in alternate embodiments of the disclosure, it is envisioned that one of the overlays 890, 892 may be omitted.

The conductive overlays 890, 892 are secured to the substrates 456, 462, and are configured in correspondence therewith (i.e., such that the shape and size of the overlay 890 is substantially similar (or identical) to the substrate 456, and the shape and size of the overlay 892 is substantially similar (or identical) to the substrate 462). As seen in FIGS. 8 and 9, the overlays 890, 892 are positioned between the respective substrates 456, 462 and the thermal spreader 472, and may be connected thereto in any suitable manner, such as, for example, via welding, or through the use of a thermal adhesive. By connecting the thermal spreader 472 to the overlays 890, 892, rather than directly to the substrates 456, 462 (as discussed above in connection with FIGS. 4-7) or the image sensors 230, 234, heat can be transferred from the substrates 456, 462, through the respective overlays 890, 892, to the thermal spreader 472 for conduction to the heat sink 448 in the manner discussed above.

Figure 10:
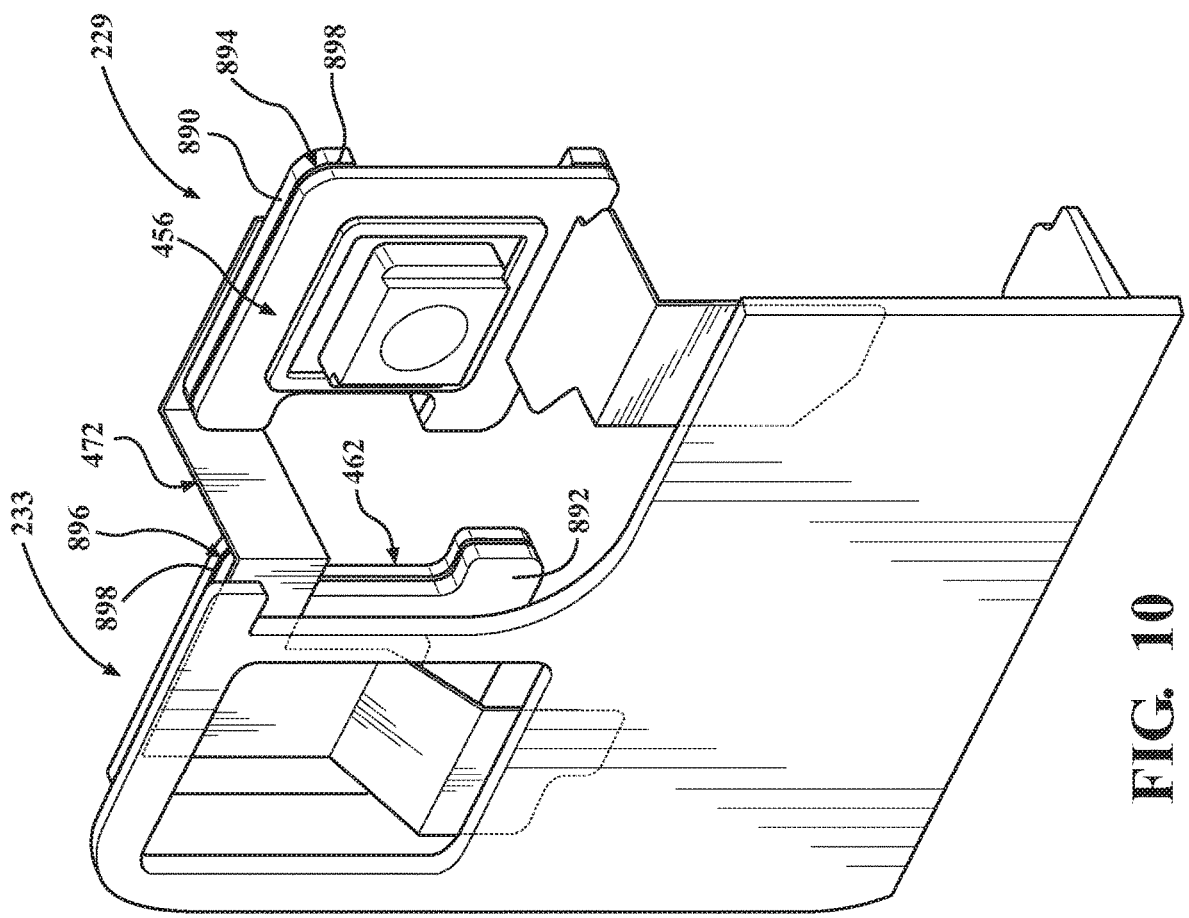
FIG. 10 is a partial, rear, perspective view of the optical module seen in FIG. 8, further including an intervening member (e.g., thermal padding).

As seen in FIGS. 8 and 9, in certain embodiments, it is envisioned that the respective overlays 890, 892 may be directly connected to the substrates 456, 462. FIG. 10, however, illustrates an alternate embodiment of the disclosure in which the ISLAs 229, 233 include intervening members 894, 896 that are positioned between the overlays 890, 892 and the respective substrates 456, 462. The intervening members 894, 896 are configured and adapted to reduce (if not entirely eliminate) air gaps between the overlays 890, 892 and the respective substrates 456, 462, thereby increasing thermal conductivity of the ISLAs 229, 233. In the particular embodiment seen in FIG. 10, for example, the intervening members 894, 896 are illustrated as including thermal padding 898. It should be appreciated, however, that the configuration and/or construction of the intervening members 894, 896 may be altered in various embodiments without departing from the scope of the present disclosure. For example, it is envisioned instead that the intervening members 894, 896 may take the form of a thermal gel.

FIG. 11 is a rear, perspective view of another embodiment of the disclosure including a thermal spreader 1000. The thermal spreader 1000 is substantially similar to the thermal spreader 472 (FIGS. 4-7) discussed above, and, accordingly, in the interest of brevity, will be described only with respect to any differences therefrom.

In contrast to the thermal spreader 472, which is formed as a single structure, the thermal spreader 1000 includes a first thermal bridge 1002 that extends between the substrate 456 and the heat sink 448, and a second thermal bridge 1004 that extends between the substrate 462 and the heat sink 448. Although illustrated as being identical in configuration, it should be appreciated that the thermal bridges 1002, 1004 may be dissimilar in alternate embodiments of the disclosure (e.g., depending upon spatial requirements, necessary or desired heat transfer for the ISLAs 229, 233, etc.).

The thermal bridge 1002 defines a maximum width Wi and a maximum thickness Ti, and the thermal bridge 1004 defines a maximum width Wii and a maximum thickness Tii. For example, it is envisioned that the widths Wi, Wii may lie substantially within the range of approximately 5 mm to approximately 25 mm (e.g., 9.8 mm to 19.6 mm), and that the thicknesses Ti, Tii may lie substantially within the range of approximately 0.025 mm to 0.1 mm (e.g., 0.032 mm to 0.064 mm), although widths Wi, Wii and/or thicknesses Ti, Tii outside of these ranges would not be beyond the scope of the present disclosure. As discussed above in connection with the thermal spreader 472 (FIGS. 4-7), it is envisioned that the widths Wi, Wii may be non-uniform (e.g., to accommodate other components of the optical module 223 or the image capture device 200), and/or that the thermal bridges 1002, 1004 may include one or more areas of reduced width.

FIG. 12 is a rear, perspective view of another embodiment of the disclosure in which the ISLAs 229, 233 include the aforementioned overlays 890, 892, and the thermal bridges 1002, 1004 are respectively connected thereto. More specifically, the thermal bridge 1002 includes a first end portion 1006 that is connected to the conductive overlay 890, and a second end portion 1008 that is connected to the heat sink 448, and the thermal bridge 1004 includes a first end portion 1010 that is connected to the conductive overlay 892, and a second end portion 1012 that is connected to the heat sink 448.

Referring now to FIGS. 4-12, by varying the configuration of the ISLAs 229, 233 and the presently disclosed thermal spreaders (e.g., the thermal spreader 472 (seen in FIGS. 4-10) and the thermal spreader 1000 (seen in FIGS. 11 and 12), significant variation and improvement in the run time of the image capture device 200 is achievable. In a baseline assembly including the thermal bridges 1002, 1004 (FIG. 11), in which each of the thermal bridges 1002, 1004 has a width W of 9.8 mm and a thickness T of 0.032 mm, a run time of approximately 7.7 minutes was achievable before reaching a threshold temperature of 75° C. for the ISLAs 229, 233 and a threshold temperature of 52° C. for the battery 322 (FIG. 3A). However, increasing the width W of each of the thermal bridges 1002, 1004 to 19.6 mm (using the baseline thickness T of 0.032 mm) results in an increased run time of 11.4 minutes before reaching the threshold temperatures of 75° C. and 52° C. for the ISLAs 229, 233 and the battery 322, respectively, and increasing the thickness T of each of the thermal bridges 1002, 1004 to 0.064 mm (using the baseline width W of 9.8 mm) results in an increased run time of 11.3 minutes before reaching the threshold temperatures of 75° C. and 52° C. Increasing the width W of each of the thermal bridges 1002, 1004 to 19.6 mm and the thickness T of each of the thermal bridges 1002, 1004 to 0.064 mm further increases the run time to 14.8 minutes before reaching the threshold temperatures of 75° C. and 52° C.

In an alternate assembly, using the baseline width W of 9.8 mm and the baseline thickness T of 0.032 mm, the run time can be increased from 7.7 minutes to 12.6 minutes by incorporating the overlays 890, 892 (FIG. 12) and the thermal padding 898.

Increases in run time are also achievable by replacing the thermal bridges 1002, 1004 with the thermal spreader 472 (seen in FIGS. 4-7). For example, using the baseline width W of 9.8 mm and the baseline thickness T of 0.032 mm for the thermal spreader 472, the run time is increased from 7.7 minutes to 12.6 minutes before reaching the threshold temperatures of 75° C. and 52° C. for the ISLAs 229, 233 and the battery 322, respectively. However, increasing the thickness T of the thermal spreader 472 to 0.064 mm (using the baseline width W of 9.8 mm) results in an increased run time of 16.3 minutes before reaching the threshold temperatures of 75° C. and 52° C., and increasing the width W to 19.6 mm in combination with the increased thickness T of 0.064 mm results in an increased run time of 18.7 minutes.

In another assembly, using the baseline width W of 9.8 mm and the baseline thickness T of 0.032 mm for the thermal spreader 472, the run time can be increased from 7.7 minutes to 16.3 minutes by incorporating the overlays 890, 892 (FIGS. 8, 9) and the thermal padding 898 (FIG. 10).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of" Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A device comprising:
  a body;
  a first image capture device supported within the body and defining a first field-of-view, the first image capture device including a first integrated sensor-lens assembly (ISLA) with a first image sensor and a first lens positioned to receive and direct light onto the first image sensor, the first lens facing in a first direction and defining a first optical axis;

a second image capture device supported within the body and defining a second field-of-view that overlaps the first field-of-view, the second image capture device including a second ISLA with a second image sensor and a second lens positioned to receive and direct light onto the second image sensor, the second lens facing in a second direction generally opposite to the first direction and defining a second optical axis offset from the first optical axis, the image capture device being configured for operation in a first mode, in which the first and second image sensors are each active such that images are capturable by each of the first and second image capture devices, and a second mode, in which only one of the first and second image sensors is active such that images are capturable by only one of the first and second image capture devices; and a thermal spreader connected to, and extending between, the first and second ISLAs, the thermal spreader being configured to transfer heat between the first and second ISLAs.

2. The image capture device of claim 1, wherein the first ISLA further includes a first printed circuit board supporting the first image sensor, and the second ISLA further includes a second printed circuit board supporting the second image sensor, the first printed circuit board including a first conductive overlay, and the second printed circuit board including a second conductive overlay, the thermal spreader being connected to the first and second conductive overlays.

3. The image capture device of claim 1, wherein the thermal spreader is unitary in construction.

4. The image capture device of claim 3, wherein the thermal spreader includes graphite.

5. The image capture device of claim 3, wherein the thermal spreader defines a maximum width substantially within a range of approximately 15 mm to approximately 25 mm.

6. The image capture device of claim 5, wherein the thermal spreader defines a maximum thickness substantially within a range of approximately 0.05 mm to approximately 0.1 mm.

7. The image capture device of claim 1, wherein the image capture device further includes a heat sink, the thermal spreader including opposing first and second end portions connected to the heat sink.

8. The image capture device of claim 7, wherein the thermal spreader includes an intermediate portion extending between the first and second end portions, the intermediate portion being connected to the first and second image sensors.

9. The image capture device of claim 8, wherein the thermal spreader is non-linear in configuration.

10. The image capture device of claim 9, wherein the thermal spreader defines a first elbow positioned adjacent to the first image sensor, a second elbow positioned between the first image sensor and the second image sensor, and a third elbow positioned adjacent to the second image sensor.

11. An optical module for an image capture device, the optical module comprising:

a first integrated sensor-lens assembly (ISLA) including a first image sensor and a first lens;

a second integrated sensor-lens assembly (ISLA) including a second image sensor and a second lens, the first ISLA and the second ISLA facing in generally opposite directions; and a bridge including a first end portion connected to the first ISLA, a second end portion connected to the second ISLA, and an intermediate portion extending between the first end portion and the second end portion, the intermediate portion including a tortuous configuration such that the intermediate portion includes bends located between the first end portion and the second end portion, and the bridge including a thermally conductive material to facilitate heat transfer between the first ISLA and the second ISLA.

12. The optical module of claim 11, wherein the first ISLA defines a first field-of-view, and the second ISLA defines a second field-of-view that overlaps the first field-of-view.

13. The optical module of claim 11, wherein the bridge is unitary in construction.

14. The optical module of claim 11, wherein the bridge includes graphite.

15. The optical module of claim 11, wherein the bridge defines a maximum width substantially within a range of approximately 15 mm to approximately 25 mm, and a maximum thickness substantially within a range of approximately 0.05 mm to approximately 0.1 mm.

16. The optical module of claim 11, wherein the bridge defines a first elbow positioned adjacent to the first ISLA, a second elbow positioned between the first ISLA and the second ISLA, and a third elbow positioned adjacent to the second ISLA.

17. A method of assembling an optical module for an image capture device, the method comprising:

connecting opposite first and second end portions of a thermal bridge to a heat sink, the first and second end portions extending in generally parallel relation; and connecting an intermediate portion of the thermal bridge extending between the first and second end portions to a first integrated sensor-lens assembly (ISLA) and to a second ISLA such that the thermal bridge extends between the first and second ISLAs to thermally connect the first and second ISLAs and facilitate heat transfer therebetween, the intermediate portion having a tortuous configuration such that the intermediate portion extends non-linearly between the first and second end portions.

18. The method of claim 17, further comprising:

orienting the first ISLA such that a lens of the first ISLA faces in a first direction; and orienting the second ISLA such that a lens of the second ISLA faces in a second direction generally opposite to the first direction, whereby a first field-of-view defined by the first ISLA overlaps a second field-of-view defined by the second ISLA.

19. The method of claim 17, wherein connecting the intermediate portion of the thermal bridge to the first ISLA and to the second ISLA includes positioning the thermal bridge such that the intermediate portion extends, at least partially, in transverse relation to image sensors of the first and second ISLAs, the thermal bridge being unitary in construction.

20. The method of claim 17, wherein connecting the opposite first and second end portions of the thermal bridge to the heat sink and connecting the intermediate portion of the thermal bridge to the first ISLA and to the second ISLA includes orienting the thermal bridge such that a first elbow of the thermal bridge is positioned adjacent to the first ISLA, a second elbow of the thermal bridge is positioned between the first ISLA and the second ISLA, and a third elbow of the thermal bridge is positioned adjacent to the second ISLA.

* * * * *